(12) United States Patent
Kubacki et al.

(10) Patent No.: US 12,241,486 B2
(45) Date of Patent: Mar. 4, 2025

(54) HYDRAULIC TRANSMISSION UNIT, PARTICULARLY FOR DEEP-SEA USE

(71) Applicant: Robert Bosch GmbH, Stuttgart (DE)

(72) Inventors: Markus Kubacki, Wuerzburg (DE); Alexandre Orth, Hettstadt (DE); Gottfried Hendrix, Gemuenden (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/260,449

(22) PCT Filed: Dec. 23, 2021

(86) PCT No.: PCT/EP2021/087456
§ 371 (c)(1),
(2) Date: Jul. 6, 2023

(87) PCT Pub. No.: WO2022/148668
PCT Pub. Date: Jul. 14, 2022

(65) Prior Publication Data
US 2024/0052944 A1     Feb. 15, 2024

(30) Foreign Application Priority Data

Jan. 8, 2021 (DE) .................... 10 2021 200 100.9

(51) Int. Cl.
*F15B 15/06*     (2006.01)
*F15B 15/18*     (2006.01)
(Continued)

(52) U.S. Cl.
CPC ............ *F15B 15/065* (2013.01); *F15B 15/18* (2013.01); *F16K 31/163* (2013.01); *F16K 31/1635* (2013.01); *F16K 31/54* (2013.01)

(58) Field of Classification Search
CPC ...... F15B 15/18; F15B 15/065; F16K 31/163; F16K 31/1635; F16K 31/54
See application file for complete search history.

(56) References Cited

U.S. PATENT DOCUMENTS 3,218,024 A * 11/1965 Kroekel .............. F16K 31/1635
                                                          91/395
4,132,071 A     1/1979   Priese et al.
(Continued)

FOREIGN PATENT DOCUMENTS

DE        37 10 376 A1    10/1988
DE        690 09 804 T2    9/1994
(Continued)

OTHER PUBLICATIONS

International Search Report corresponding to PCT Application No. PCT/EP2021/087456, mailed Apr. 5, 2022 (German and English language document) (7 pages).

*Primary Examiner* — Thomas E Lazo
(74) *Attorney, Agent, or Firm* — Maginot, Moore & Beck LLP

(57) ABSTRACT

The disclosure relates to a transmission unit having (i) a housing for the fluid-tight encapsulation of at least one part of the transmission unit, (ii) a rack and pinion transmission which is arranged in the housing and has at least one gear rack, (iii) a hydraulic drive system, which is arranged in the housing, has at least one displacer unit for increasing the energy of a pressurizable working fluid of the hydraulic drive system, and has at least one chamber in which a piston, operatively connected to a gear rack of the rack and pinion transmission, can be moved using the working fluid in order to effect a linear movement of the gear rack, and (iv) a rotatable mechanical actuator, which is operatively connected to the pinion of the rack and pinion transmission and is arranged outside the housing at least in portions.

13 Claims, 7 Drawing Sheets

(51) Int. Cl.
*F16K 31/163* (2006.01)
*F16K 31/54* (2006.01)

(56) References Cited

U.S. PATENT DOCUMENTS

| | | | | |
|---|---|---|---|---|
| 4,986,301 | A * | 1/1991 | Ziliani | F16K 31/163 |
| | | | | 74/89.17 |
| 8,752,806 | B2 * | 6/2014 | Schaible | F15B 15/18 |
| | | | | 251/74 |
| 8,997,626 | B2 * | 4/2015 | Anderson | F16K 15/044 |
| | | | | 91/437 |
| 2019/0085651 | A1 * | 3/2019 | Phielipeit-Spiess | E21B 41/04 |

FOREIGN PATENT DOCUMENTS

| | | | | |
|---|---|---|---|---|
| DE | 10 2012 002 435 A1 | 8/2013 | | |
| DE | 10 2017 206 596 A1 | 10/2018 | | |
| EP | 2101061 A1 * | 9/2009 | | F04B 53/16 |
| EP | 2770218 A2 * | 8/2014 | | F15B 15/18 |
| GB | 2483671 A | 3/2012 | | |
| WO | 2012/084093 A1 | 6/2012 | | |
| WO | 2020/141265 A1 | 7/2020 | | |

* cited by examiner

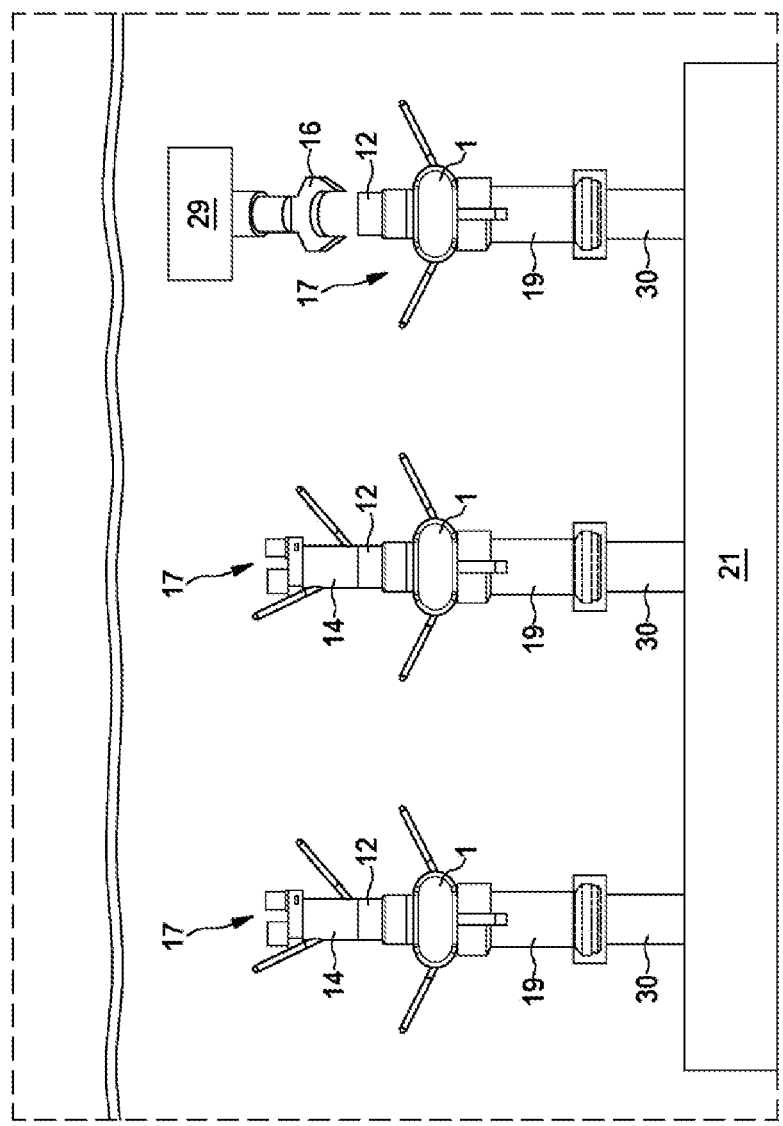

HYDRAULIC TRANSMISSION UNIT, PARTICULARLY FOR DEEP-SEA USE

This application is a 35 U.S.C. § 371 National Stage Application of PCT/EP2021/087456, filed on Dec. 23, 2021, which claims the benefit of priority to Serial No. DE 10 2021 200 100.9, filed on Jan. 8, 2021 in Germany, the disclosures of which are incorporated herein by reference in their entirety.

BACKGROUND

The disclosure relates to a transmission unit, in particular for underwater use, an electrohydraulic, modular system, in particular for underwater use, as well as the use of at least one transmission unit described here or of a system described here for operating an underwater armature, in particular a deep-sea armature having at least one deep-sea valve, e.g. a deep-sea ball valve.

Electrohydraulic actuators are known for deep-sea applications and are used to move an element under water at water depths of up to several thousand meters in connection with the production of petroleum and natural gas, mining, scientific research, or infrastructure projects. Process valves, with which the flow rate of the medium being conveyed can be controlled or blocked, are thus found in, e.g., petroleum or natural gas conveying systems at deep ocean depths.

Known electrohydraulic actuators used for deep-sea applications are typically configured to perform a linear motion in order to open and close deep-sea valves. However, if one would like to use the known actuators for larger deep-sea valves, e.g. relatively large ball valves, the (linear) displacement forces required can be so high that more space-intensive hydraulic systems would be required in order to provide correspondingly greater hydraulic pressures. However, this conflicts with the aim of designing actuators as compactly as possible for deep-sea applications so that they can be easily replaced under water, e.g., by a marine robot with a limited payload.

In addition, electronic components, e.g., an electric machine for driving the hydraulic pump of the actuator, are integrated into the known electrohydraulic actuators used for deep-sea applications. However, it has been shown that these electronic components represent the elements of the actuators that wear out the fastest or most frequently and thus significantly determine the maximum service life of the electrohydraulic actuators under water.

On this basis, the task of the disclosure is to at least partially solve the disadvantages or problems described in connection with the prior art. In particular an electrohydraulic actuator system for deep-sea applications is to be provided, which can also be used to operate larger deep-sea valves, e.g., comparatively large ball valves, while also enabling a compact structural design and an increased service life.

SUMMARY

These tasks are achieved by means of a transmission unit and by means of a system as disclosed herein. Further configurations of the transmission unit and the system are specified below. It should be noted that the description, in particular in connection with the drawings, specifies further details and further developments of the disclosure able to be combined with the features in the claims.

Contributing hereto is a transmission unit comprising:
- a housing for the fluid-tight encapsulation of at least one part of the transmission unit,
- a rack and pinion transmission which is arranged in the housing and has at least one gear rack,
- a hydraulic drive system, which is arranged in the housing, has at least one displacer unit for increasing the energy of a pressurizable working fluid of the hydraulic drive system and has at least one chamber in which a piston, operatively connected to a gear rack of the rack and pinion transmission, can be moved using the working fluid in order to effect a linear movement of the gear rack,
- a rotatable mechanical actuator, which is operatively connected to the pinion of the rack and pinion transmission and arranged outside the housing at least in portions.

The transmission unit is in particular a transmission unit for an electrohydraulic, modular system. Said system can be the system described here. In addition, the transmission unit can be a transmission unit for underwater use, particularly for deep-sea applications. The latter relates in particular to underwater use at water depths of at least one thousand meters, or even depths of at least two thousand meters.

The transmission unit comprises a housing for the fluid-tight (liquid-tight) encapsulation of at least one part of the transmission unit. In particular, the housing (entirely) encapsulates or encloses at least the rack and pinion transmission and the hydraulic drive system of the transmission unit. In other words, this means in particular that at least the rack and pinion transmission and the hydraulic drive system of the transmission unit are (entirely) surrounded by the housing and/or sealed from the environment and/or shielded from the environment.

The transmission unit further comprises a rack and pinion transmission (entirely) arranged in the housing and having at least one gear rack. The rack-and-pinion transmission preferably comprises two gear racks, which are in particular aligned parallel to each other, wherein the pinion is arranged between the two gear racks and/or arranged to mesh with both gear racks. The rack and pinion transmission enables an advantageous rotary actuator system and thereby advantageously helps provide an actuator that can be used to operate larger deep-sea valves, e.g. comparatively large ball valves. The rack and pinion transmission in this case however enables a compact design that is structurally simple.

The transmission unit further comprises a hydraulic drive system (entirely) arranged in the housing and having at least one displacer unit for increasing the energy of a pressurizable working fluid of the hydraulic drive system and having at least one chamber in which a piston, operatively connected to a gear rack of the rack and pinion transmission, can be moved using the working fluid in order to effect a linear movement of the gear rack. For example, the displacer unit can be formed as a hydraulic pump. The displacer unit can further comprise, e.g., at least one hydraulic pump, such as an axial piston pump. The pressurizable working fluid can, e.g., be formed by means of a hydraulic fluid, e.g. a hydraulic oil. The at least one chamber and the displacer unit as a rule are connected to each other via hydraulic passages. The at least one gear rack can be connected on one or both sides (at one end or at both ends) to a piston.

If only one end of the gear rack is connected to a piston, then a biasing element, e.g. a compression spring, can be connected at the other end to bias the gear rack in a linear manner. The number of chambers as a rule corresponds to the number of pistons.

The transmission unit further comprises a rotatable mechanical actuator operatively connected to the pinion of the rack and pinion transmission and arranged outside the housing, at least in portions. For example, the actuator can be connected to the pinion mechanically and/or in a rotationally fixed manner. For example, the actuator can be an output shaft of the transmission unit. The lateral surface area of the actuator can be designed to have external gear teeth.

In particular, the transmission unit does not comprise any electronic components. Preferably, the transmission unit does not, e.g., comprise an electric motor. If the transmission unit is integrated into an electrohydraulic, modular system as described here, then the displacer unit can be driven by, e.g., an external electric motor, which can be integrated into, e.g., a control module that can be coupled to the transmission unit. The presence of electronic components in the transmission unit not being required advantageously contributes to the achievability of a particularly compact design and an increased service life.

According to one advantageous configuration, it is proposed that the fluid-tight (fluidically sealed) encapsulation be suitable or configured for underwater use of the transmission unit. Preferably, the fluid-tight encapsulation is suitable for underwater use of the transmission unit at water depths of at least one thousand meters, or even depths of at least two thousand meters. For this purpose, the housing can, e.g., be designed in the form of a pressure vessel and/or equipped with suitable seals.

According to a further advantageous configuration, it is proposed that the at least one displacer unit comprise a hydraulic torque regulator for limiting the drive torque of the displacer unit. The hydraulic torque regulator can be configured to automatically hydraulically adjust the drive torque of the displacer unit. In particular, the torque controller can limit the (maximum) drive torque. In other words this means in particular that the hydraulic torque regulator can set the drive torque (of the displacer unit) of the transmission device in particular to a constant value, (substantially) independently of the output torque (of the actuator) of the transmission unit. In order to achieve a constant drive torque as a function of the operating pressure of the working fluid, the displacement angle of an axial piston pump of the displacer unit can, e.g., be changed to maintain a constant drive torque. The torque regulator therefore advantageously contributes to the transmission unit being driven at comparatively low drive torques, while also providing high output torques in order to operate comparatively large valves. Doing so in particular enables the transmission unit to be driven by comparatively small electric motors or manipulators in small deep-sea robots, or even manually.

According to a further advantageous configuration, it is proposed that the transmission unit further comprise a mechanical interface. At least portions of the interface can be arranged outside of the housing. For example, at least portions of the interface can protrude from the housing. Furthermore, the interface can be suitable or configured for transferring mechanical work performed externally at the interface in order to increase the energy of the working fluid of the hydraulic drive system. For example, the interface can be operatively connected or mechanically connected to the displacer unit. The mechanical interface advantageously helps ensure that the transmission unit can function without electronic components because it can be driven via the interface by means of an external (electronic) control module.

In this regard, it is preferred that the mechanical interface comprise at least one connector for a (external and/or electronic) control module. The connector for the control module can, e.g., comprise a shaft end of a drive shaft of the transmission unit operatively connected to the displacer unit. This shaft end of the drive shaft of the transmission unit can be adapted or configured to connect to an output shaft of the control module in a rotationally fixed manner.

In this context, it is further advantageous for the mechanical interface to form an element, on which an external manipulator can perform mechanical work. It is particularly advantageous for the mechanical interface to form an element, on which an external manipulator can perform mechanical work in addition to and/or independently of the connector for the control module (or separated from and/or adjacent thereto). The external manipulator can, e.g., be a gripper of a deep-sea robot and/or an output shaft of a deep-sea robot. However, a human hand would also be conceivable as a manipulator, so that mechanical work can, e.g., also be performed manually on the element. Such an element can be formed by, e.g., a shaft end of a drive shaft of the transmission unit operatively connected to the displacer unit. This element or shaft end of the drive shaft of the transmission unit can be adapted or configured to connect to an output shaft of a deep-sea robot in a rotationally fixed manner. The element and the connector for the control module are preferably arranged in a common receptacle of the interface.

Proposed according to another aspect is an electrohydraulic, modular system, particularly for underwater use, and comprising:
 a transmission unit described here,
 an electronic control module that can be coupled to the transmission unit for converting electrical energy into mechanical work to be performed on the transmission unit.

The electrohydraulic, modular system is in particular such a system for underwater use, in particular for deep-sea applications. The latter relates in particular to underwater use at water depths of at least one thousand meters, or even at depths of least two thousand meters. The system can, e.g., form a deep-sea actuator, in particular for operating an underwater armature.

The control module can, e.g., be coupled to the transmission unit via the interface. Electrical power can be supplied to the control module, e.g., via a marine cable. The control module can perform mechanical work on the transmission unit, in particular on the interface of the transmission unit. For example, mechanical work can be performed in the form of a (constant) torque from an output shaft of the control module.

The modular design advantageously helps ensure that the system can be more easily installed on, e.g., an underwater armature by, e.g., a relatively small deep-sea robot. In this context, it is also advantageous if the electronic control module comprises all the electronic components of the system, so, given wear on an electronic component, only the control module and not the system or an entire deep-sea actuator need be replaced.

According to one advantageous configuration, it is proposed that the control module comprise at least one electric motor. The electric motor can be integrated into the control module. The electric motor can be configured to operate at a constant rotational speed. In particular, this contributes to the most efficient as possible operation of the control module. The electric motor can be connected to an output shaft of the control module, or a portion of the electric motor can form the output shaft.

According to a further advantageous configuration, it is proposed that the system further comprise at least one adapter that can be coupled to the actuator of the transmission unit. The adapter is in particular adapted or configured to transfer mechanical energy from the actuator to a consumer. The system can comprise various adapters so that the system can be connected to various connector geometries as easily as possible.

According to a further advantageous embodiment configuration, it is proposed that the system further comprise at least one storage means connectable to the transmission unit for storing mechanical energy, which storage means can upon demand be operatively connected to the hydraulic drive system of the transmission unit. For example, two such storage means can be connected to the transmission unit, wherein each of them is associated with a particular hydraulic circuit of the drive system. To store the mechanical energy, a compressible element, e.g. a gas or a spring, can be stored in a compressed state in the storage means. Upon demand, the at least one storage means can (e.g., during an emergency valve closure) deliver stored mechanical energy to the hydraulic drive system to sufficiently increase the pressure of the working fluid, even when the displacer unit is producing no drive power.

Proposed according to another aspect is the use of at least one transmission unit described here or of a system described here for operating an underwater armature. For example, the underwater armature can be a deep-sea armature used for controlling fluid flows in deep-sea applications, e.g., oil or gas production. The underwater armature can comprise at least one underwater valve, e.g., a ball valve, which can be operated by means of the transmission unit or the system.

The details, features, and advantageous configurations explained in connection with the transmission can accordingly also occur in the system presented here and/or the use thereof, and vice versa. In this respect, reference is made to the entirety of said explanations for a more specific characterization of the features.

BRIEF DESCRIPTION OF THE DRAWINGS

The solution presented here and the technical environment thereof are explained in greater detail hereinafter with reference to the drawings. It should be noted that the disclosure is not intended to be limited by the embodiment examples disclosed. In particular, unless explicitly stated otherwise, it is also possible to extract partial aspects of the factual subject matter explained in the drawings and to combine them with other components and/or insights based on other drawings and/or the present description. Shown by way of example and schematically are:

FIG. 8: an advantageous use of transmission units and systems described here.

DETAILED DESCRIPTION

Figure 1:
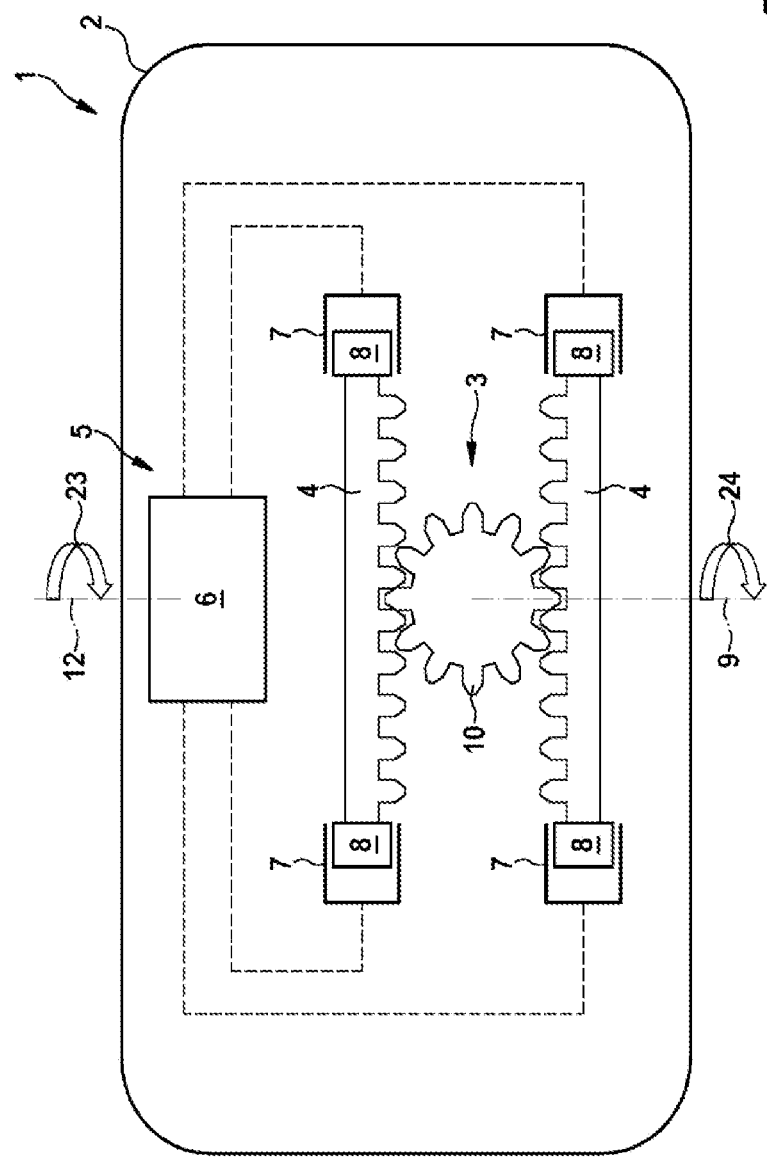
FIG. 1: a cross-sectional view of one embodiment variant of a transmission unit described here.
Figure 2:
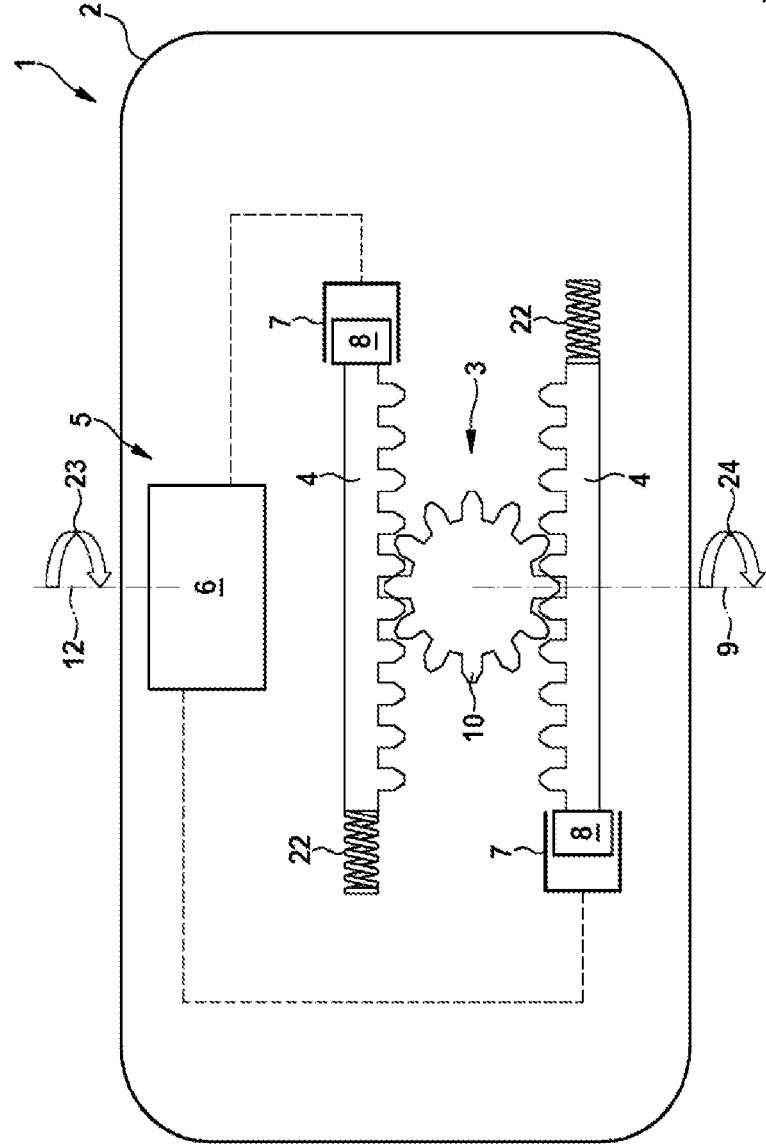
FIG. 2: a cross-sectional view of a further embodiment variant of a transmission unit described here.

FIGS. 1 and 2 each show a transmission unit 1 comprising a housing 2 for the fluid-tight encapsulation of at least one part of the transmission unit 1, and comprising a rack and pinion transmission 3 which is arranged in the housing 2 and has at least one gear rack 4 (in this case having two gear racks, by way of example). The transmission unit 1 also comprises a hydraulic drive system 5 arranged in the housing 2 and having at least one displacer unit 6 for increasing the energy of a pressurizable working fluid of the hydraulic drive system 5 and having at least one chamber 7 in which a piston 8 operatively connected to a gear rack 4 of the rack and pinion transmission 3 is operatively connected to the working fluid in order to effect a linear movement of the gear rack 4.

In this context, FIG. 1 shows an embodiment variant comprising two chambers 7 and two pistons 8 per gear rack 4, and FIG. 2 shows an embodiment variant comprising one chamber 7 and one piston 8, as well as one biasing element 22 for each gear rack 4. The transmission unit 1 further comprises a rotatable mechanical actuator 9, which is operatively connected to the pinion 10 of the rack and pinion transmission 3 and is arranged outside of the housing 2 at least in portions.

A drive torque 23 can be provided to the displacer unit 6 via a mechanical interface 12. An output torque 24 can be provided on the mechanical actuator 9.

The fluid-tight encapsulation is preferably suitable for underwater use of the transmission unit 1 or for deep-sea applications.

Figure 3:
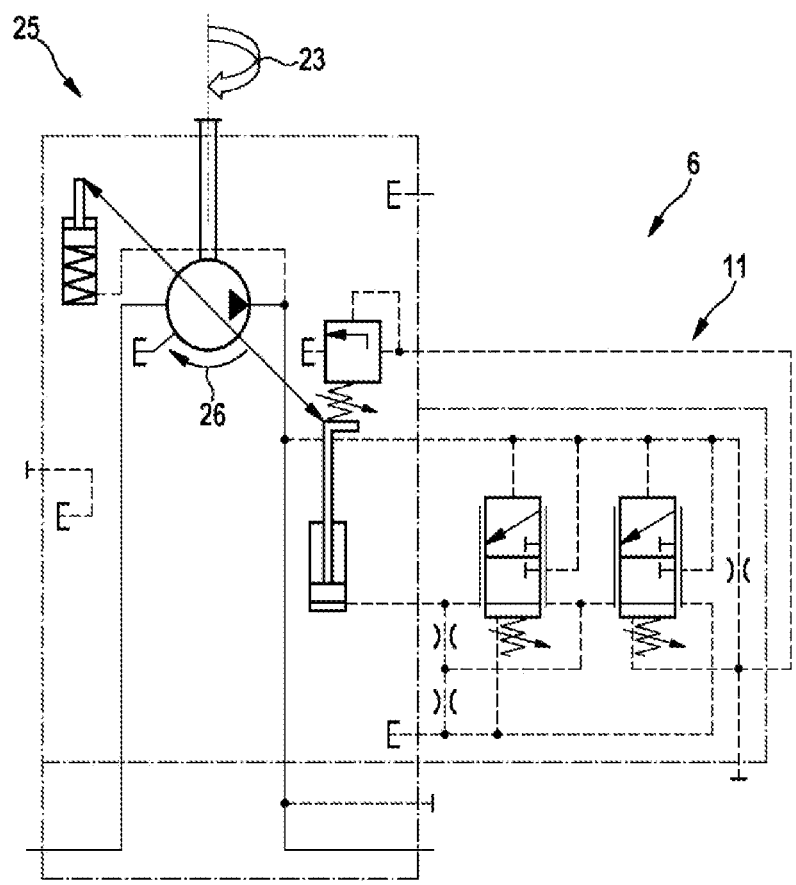
FIG. 3: a cross-sectional view of a displacer unit for a transmission unit described here.

FIG. 3 shows a displacer unit 6, which is usable as shown by way of example in FIG. 1 or FIG. 2. The displacer unit 6 comprises, e.g., an axial piston pump 25 for pressurizing the working fluid. The axial piston pump 25 is driven via the drive torque 23. The displacer unit 6 further comprises a hydraulic torque regulator 11 for limiting the drive torque 23 of the displacer unit 6. In order to achieve a constant drive torque 23 as a function of the operating pressure of the working fluid, the displacement angle 26 of the axial piston pump 25 can, e.g., be changed to keep the drive torque 23 constant.

Figure 4:
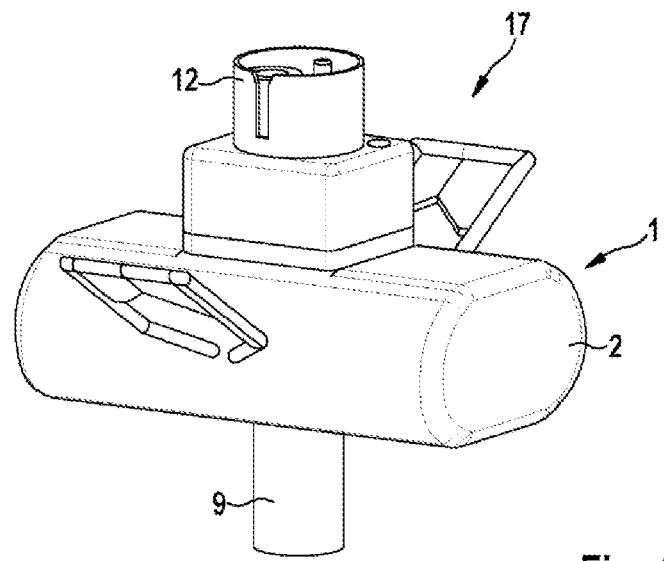
FIG. 4: a perspective view of an embodiment variant of a system described here.

FIG. 4 illustrates by way of example the fact that, and optionally how, the transmission unit 1 can further comprise a mechanical interface 12, at least in sections of which are arranged outside of the housing 2 and is suitable for transferring mechanical work performed externally at the interface 12 in order to increase the energy of the working fluid of the hydraulic drive system 5.

Figure 5:
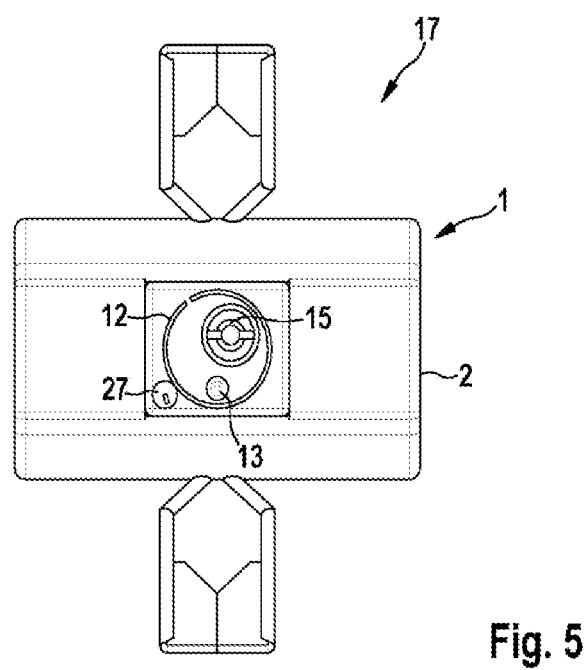
FIG. 5: an overhead view of the embodiment variant of the system shown in FIG. 4, FIG. 6: a perspective view of a further embodiment variant of a system described here.

In FIG. 5, the interface 12 is shown in an overhead view. It can be seen that the mechanical interface can comprise at least one connector 13 for a control module 14 and can, e.g., additionally form an element 15, on which an external manipulator 16 can perform mechanical work. Also shown in FIG. 5 is, e.g., a positioning aid 27, such as an optical marker for the orientation of, e.g., a deep-sea robot 29.

Figure 6:
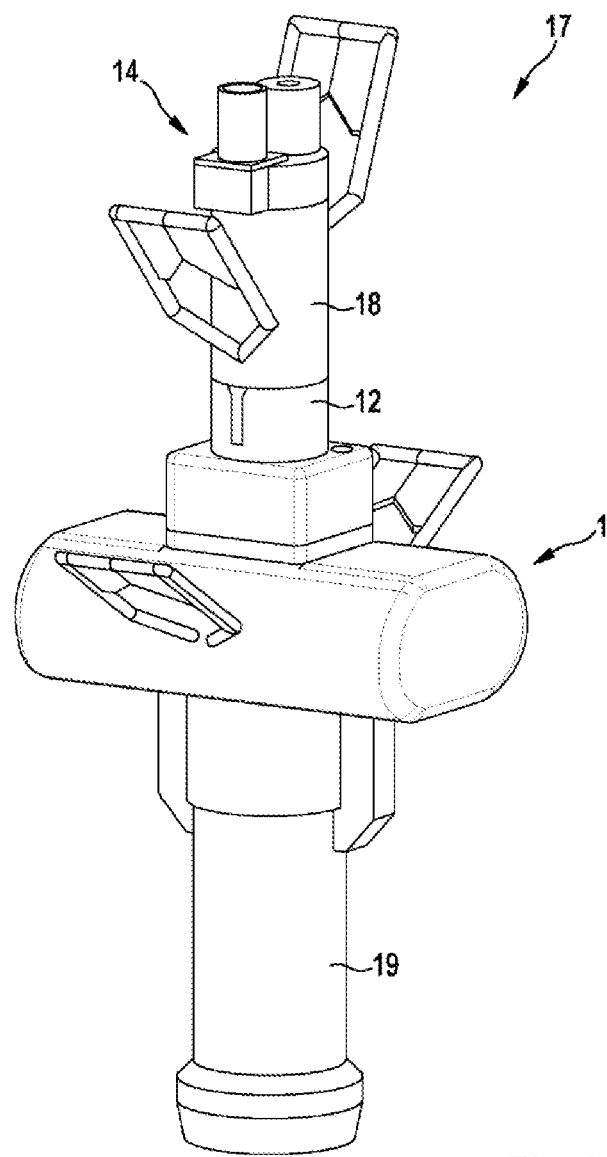

FIG. 6 shows by way of example an electrohydraulic modular system 17, in particular for underwater use, comprising a transmission unit 1 described here, as well as an electronic control module 14 that can be coupled to the transmission unit 1 in order to convert electrical energy into work to be performed on the transmission unit 1. For example, the control module 14 can comprise at least one electric motor 18 for this purpose. The control module 14 is, e.g., connected to the mechanical interface 12 of the transmission unit 1.

The system 17 shown in FIG. 6 comprises, e.g., an adapter 19 coupled to the actuator 9 of the transmission unit 1. The adapter 19 is in particular used to transfer mechanical energy from the actuator 9 to a consumer, such as a valve.

Figure 7:
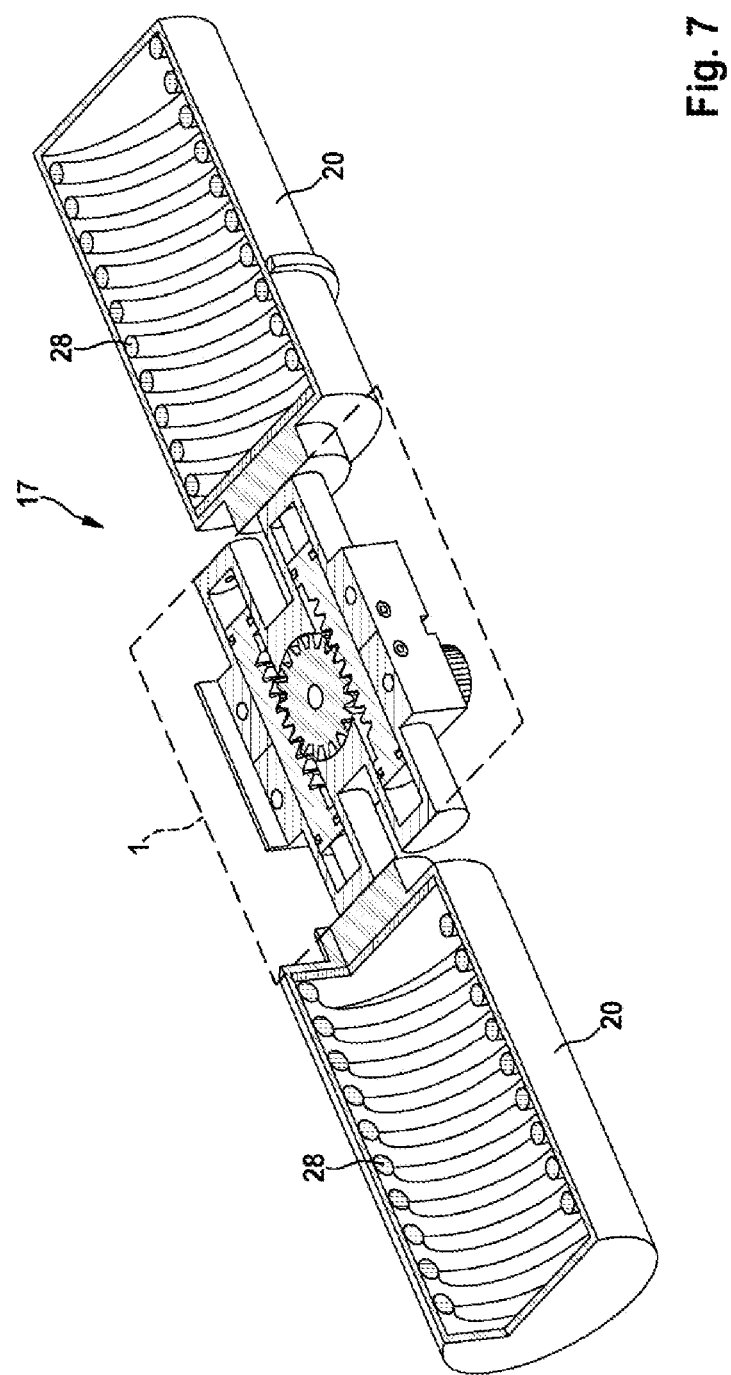
FIG. 7: a cross-sectional view of a further embodiment variant of a system described here.

FIG. 7 illustrates that the system 17 can further comprise at least one storage means 20 connectable to the storage means 1 for storing mechanical energy, which can upon demand be operatively connected to the hydraulic drive system 5 of the transmission unit 1. For example, two storage means 20 are provided in this case. A spring 28 is provided in each of the storage means 20.

FIG. 8 illustrates, by way of example, a use of the transmission unit 1 described here or the systems 17 described here for operating an underwater armature 21. The underwater armature 21 comprises, e.g., three deep-sea valves 30, each of which can be operated by means of a system 17 described here. Two of the transmission units 1 are operated by a control module 14 of the relevant system 17. For example, the transmission unit 1 shown on the right can be operated by a manipulator 16 of a deep-sea robot 29.

LIST OF REFERENCE NUMBERS

1 Transmission unit
2 Housing
3 Rack and pinion transmission
4 Gear rack
5 Drive system
6 Displacer unit
7 Chamber
8 Piston
9 Actuator
10 Pinion
11 Torque regulator
12 Interface
13 Connector
14 Control module
15 Element
16 Manipulator
17 System
18 Electric motor
19 Adapter
20 Storage means
21 Underwater armature
22 Biasing element
23 Drive torque
24 Output torque
25 Axial piston pump
26 Adjustment angle
27 Positioning aid
28 Spring
29 Marine robot
30 Deep-sea valve

The invention claimed is:

1. A transmission unit comprising:
 a housing;
 a rack and pinion transmission arranged in the housing and including at least one gear rack;
 a hydraulic drive system arranged in the housing, the hydraulic drive system comprising:
  at least one displacer unit configured to increase energy of a pressurizable working fluid of the hydraulic drive system; and
  at least one chamber in which a piston, which is operatively connected to a gear rack of the rack and pinion transmission, is moved using the working fluid in order to effect a linear movement of the gear rack; and
 a rotatable mechanical actuator operatively connected to the pinion of the rack and pinion transmission and at least a portion of which is arranged outside the housing,
 a mechanical interface arranged at least partially outside the housing, the mechanical interface operably connected to the at least one displacer unit and configured to transfer mechanical work performed externally to the housing to the at least one displacer unit so as to increase the energy of the working fluid of the hydraulic drive system,
 wherein the mechanical interface comprises at least one connector for a control module that includes an electric motor configured to rotate the at least one connector to perform the mechanical work performed externally to the housing, and
 wherein the housing is configured to form a fluid-tight encapsulation of the at least one gear rack, the at least one displacer unit, and the at least one chamber of the hydraulic drive system.

2. The transmission unit according to claim 1, wherein the fluid-tight encapsulation is configured for an underwater use of the transmission unit.

3. The transmission unit according to claim 1, wherein:
 the at least one displacer unit comprises a hydraulic torque regulator configured to limit a drive torque of the displacer unit, and
 the hydraulic torque regulator includes a first hydraulic valve and a second hydraulic valve each operably connected to an axial piston pump of the at least one displacer unit.

4. The transmission unit according to claim 1, wherein the mechanical interface forms a manipulation element on which an external manipulator performs mechanical work.

5. A method comprising:
 operating an underwater armature using the at least one transmission unit according to claim 1.

6. The transmission unit according to claim 1, wherein the mechanical interface includes a connector for connecting to the control module.

7. The transmission unit according to claim 1, wherein the mechanical interface includes a positioning aid for an orientation of the control module relative to the mechanical interface.

8. An electrohydraulic modular system comprising:
 a transmission unit comprising:
  a housing;
  a rack and pinion transmission arranged in the housing and including at least one gear rack;
  a hydraulic drive system arranged in the housing, the hydraulic drive system comprising:
   at least one displacer unit configured to increase energy of a pressurizable working fluid of the hydraulic drive system; and
   at least one chamber in which a piston, which is operatively connected to a gear rack of the rack and pinion transmission, is moved using the working fluid in order to effect a linear movement of the gear rack; and
  a rotatable mechanical actuator operatively connected to the pinion of the rack and pinion transmission and at least a portion of which is arranged outside the housing;

a mechanical interface arranged at least partially outside the housing, the mechanical interface operably connected to the at least one displacer unit and configured to transfer mechanical work performed externally to the housing to the at least one displacer unit so as to increase the energy of the working fluid of the hydraulic drive system, the mechanical interface including at least one connector; and an electronic control module configured to couple to the transmission unit using the at least one connector of the mechanical interface, the electronic control module including an electric motor configured to rotate the at least one connector to convert electrical energy into the mechanical work performed externally to the housing, wherein the housing is configured to form a fluid-tight encapsulation of the at least one gear rack, the at least one displacer unit, and the at least one chamber of the hydraulic drive system.

9. The system according to claim 8, further comprising:
at least one adapter configured to be coupled to the actuator of the transmission unit.

10. The system according to claim 8, further comprising:
at least one storage mechanism configured to connect to the transmission unit to store mechanical energy, the storage mechanism configured to be connected to the hydraulic drive system of the transmission unit upon demand.

11. The system according to claim 8, wherein the system is configured for underwater use.

12. The system according to claim 8, wherein the mechanical interface includes a connector for connecting to the control module.

13. The system according to claim 8, wherein the mechanical interface includes a positioning aid for an orientation of the control module relative to the mechanical interface.

* * * * *